(12) United States Patent
Vamvas

(10) Patent No.: US 10,533,531 B2
(45) Date of Patent: *Jan. 14, 2020

(54) ECCENTRICALLY ROTATING MASS TURBINE

(71) Applicant: Vassilios Vamvas, Bedford, MA (US)

(72) Inventor: Vassilios Vamvas, Bedford, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/032,045

(22) Filed: Jul. 10, 2018

(65) Prior Publication Data

US 2018/0372061 A1    Dec. 27, 2018

Related U.S. Application Data

(63) Continuation-in-part of application No. 15/193,104, filed on Jun. 26, 2016, now Pat. No. 10,060,408.

(60) Provisional application No. 62/210,455, filed on Aug. 27, 2015, provisional application No. 62/185,627, filed on Jun. 28, 2015.

(51) Int. Cl.
| | |
|---|---|
| *F03B 13/22* | (2006.01) |
| *F03B 13/20* | (2006.01) |
| *H02K 7/18* | (2006.01) |
| *B63B 35/44* | (2006.01) |
| *F03B 13/18* | (2006.01) |

(52) U.S. Cl.
CPC .............. *F03B 13/22* (2013.01); *B63B 35/44* (2013.01); *F03B 13/1815* (2013.01); *F03B 13/20* (2013.01); *H02K 7/1823* (2013.01); *H02K 7/1853* (2013.01); *B63B 2035/4466* (2013.01); *F05B 2220/32* (2013.01); *F05B 2220/706* (2013.01); *F05B 2220/7068* (2013.01); *F05B 2240/40* (2013.01); *F05B 2240/93* (2013.01); *F05B 2270/604* (2013.01)

(58) Field of Classification Search
CPC ....... F03B 13/20; F03B 13/22; F03B 13/1815
See application file for complete search history.

(56) References Cited

U.S. PATENT DOCUMENTS

| | | | | |
|---|---|---|---|---|
| 3,231,749 | A * | 1/1966 | Hinck, III | F03B 13/20 290/53 |
| 4,266,143 | A * | 5/1981 | Ng | F03B 13/20 290/42 |
| 4,352,023 | A * | 9/1982 | Sachs | F03B 13/20 290/42 |
| 4,599,858 | A * | 7/1986 | La Stella | F03B 13/186 290/42 |
| 7,453,165 | B2* | 11/2008 | Hench | F03B 13/20 290/42 |
| 7,989,975 | B2* | 8/2011 | Clement | F03B 13/20 290/53 |
| 8,614,521 | B2* | 12/2013 | Babarit | F03B 13/20 290/42 |

(Continued)

*Primary Examiner* — Sean Gugger

(57) ABSTRACT

A turbine comprises a shaft (20), a mass (10) eccentrically mounted for rotation about shaft (20), having its center of gravity at a distance from the shaft (20) and a motion base (15). Motion base (15) rigidly supports the shaft (20), and is configured for moving the shaft (20) in any direction of at least two degrees of movement freedom, except for heave. A floating vessel-turbine (120), encloses entirely the eccentrically rotating mass (10) and the motion base (15). The turbine converts ocean wave energy into useful energy, very efficiently.

16 Claims, 15 Drawing Sheets

(56) References Cited

U.S. PATENT DOCUMENTS

| | | | | |
|---|---|---|---|---|
| 2004/0041401 A1* | 3/2004 | Trenchev | ............... | F03G 7/10 |
| | | | | 290/1 R |
| 2009/0041575 A1* | 2/2009 | Morch | ............... | F03B 13/145 |
| | | | | 415/124.1 |
| 2011/0265468 A1* | 11/2011 | Paakkinen | ............ | F03B 13/20 |
| | | | | 60/499 |
| 2015/0000263 A1* | 1/2015 | Foster | .................. | F03B 13/16 |
| | | | | 60/504 |

\* cited by examiner

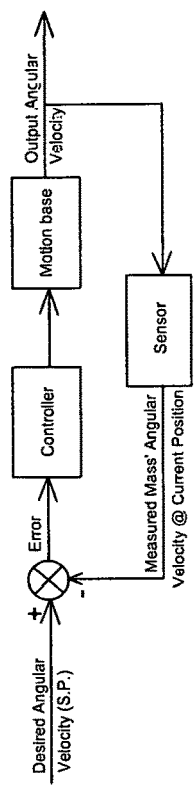
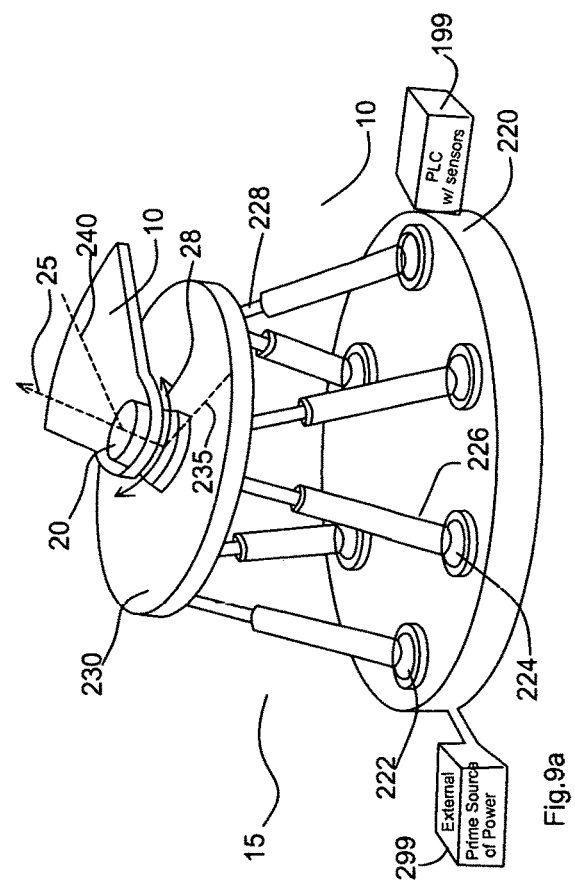
Fig.9b
Fig.9a

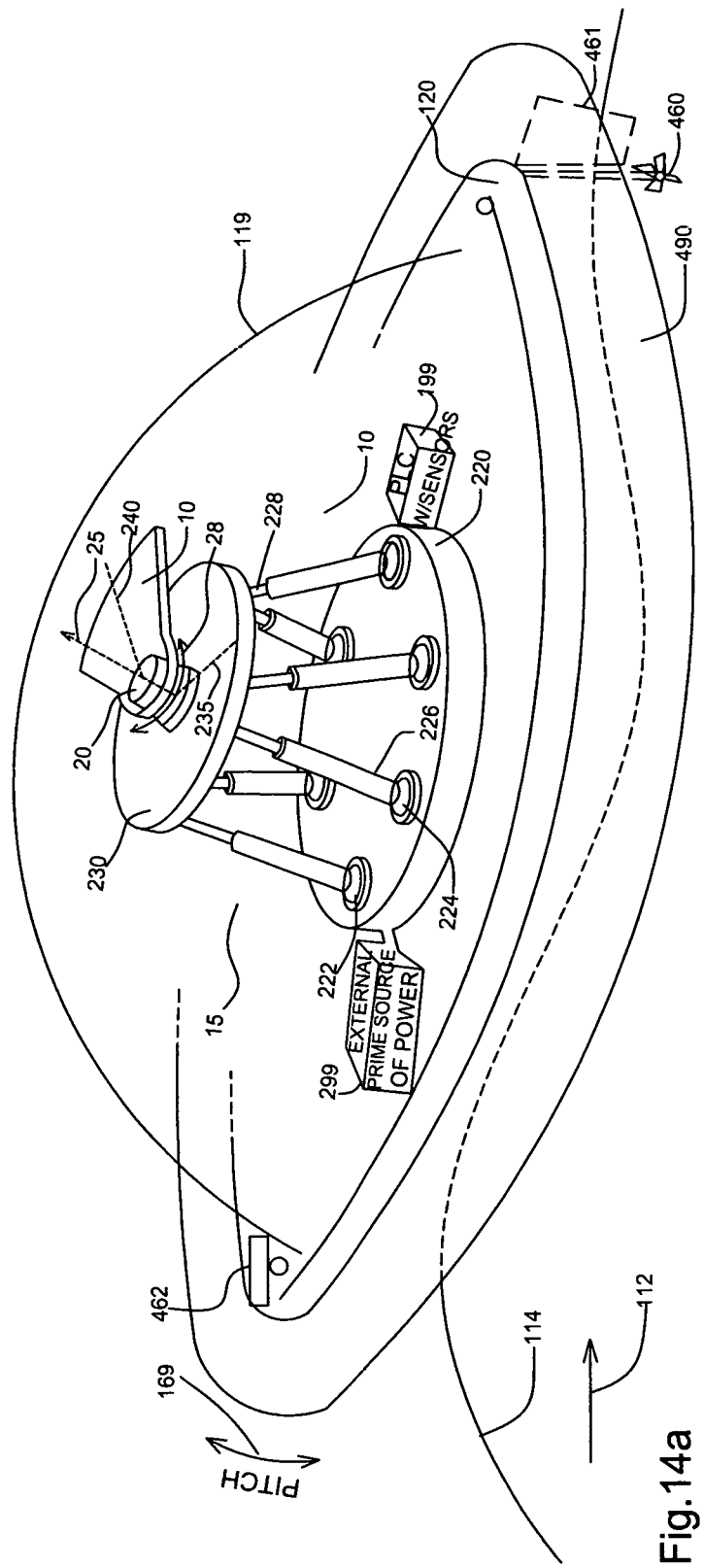

ECCENTRICALLY ROTATING MASS TURBINE

CROSS-REFERENCE TO RELATED APPLICATIONS

This application is a continuation-in-part of U.S. patent application Ser. No. 15/193,104 and claims the benefit of U.S. patent application Ser. No. 15/193,104, U.S. provisional patent application Ser. No. 62/185,627 and U.S. provisional patent application Ser. No. 62/210,455 submitted by the same inventor and incorporated herein by reference in their entirety.

BACKGROUND

The following is a tabulation of some prior art that presently appears relevant:

U.S. Patents

| Patent Number | Kind Code | Issue Date | Patentee |
| --- | --- | --- | --- |
| 8,915,077 | B2 | 2014 Dec. 23 | Paakkinen |
| 8,887,501 | B2 | 2014 Nov. 18 | Paakkinen |
| 8,739,512 | B2 | 2014 Jun. 03 | Kanki |
| 8,614,521 | B2 | 2013 Dec. 24 | Babarit et al. |
| 8,456,026 | B2 | 2013 Jun. 04 | Cleveland |
| 8,269,365 | B2 | 2012 Sep. 18 | Clement et al. |
| 8,046,108 | B2 | 2011 Oct. 25 | Hench |
| 7,989,975 | B2 | 2011 Aug. 02 | Clement et al. |
| 7,934,773 | B2 | 2011 May 03 | Boulais et al. |
| 7,906,865 | B2 | 2011 Mar. 15 | Minguela et al. |
| 7,484,460 | B2 | 2009 Feb. 03 | Blum et al. |
| 7,453,165 | B2 | 2008 Nov. 18 | Hench |
| 7,375,436 | B1 | 2008 May 20 | Goldin |
| 7,003,947 | B2 | 2006 Feb. 26 | Kanki |
| 6,888,262 | B2 | 2005 May 03 | Blakemore |
| 6,876,095 | B2 | 2005 Apr. 05 | Williams |
| 6,095,926 | | 2000 Aug. 01 | Hettema et al. |
| 6,027,342 | | 2000 Feb. 22 | Brown |
| 4,843,250 | | 1989 Jun. 27 | Stupakis |
| 4,352,023 | | 1982 Sep. 28 | Sachs et al. |
| 4,266,143 | | 1981 May 05 | Ng |
| 3,577,655 | | 1971 May 04 | Pancoe |
| 3,231,749 | | 1966 Jan. 25 | Hinck |
| 937,712 | | 1909 Oct. 19 | McFarland |

U.S. Patent applications

| Patent Number | Kind Code | Issue Date | Applicant |
| --- | --- | --- | --- |
| 2015/0123406 | A1 | 2015 May 07 | Paakkinen |
| 2012/0001432 | A1 | 2012 Jan. 05 | Clement et al. |
| 2011/0012443 | A1 | 2011 Jan. 20 | Powers |

WO Patent applications

| Patent Number | Kind Code | Issue Date | Applicant |
| --- | --- | --- | --- |
| WO2012103890 | A1 | 2012 Aug. 09 | Jan Olsen |
| WO2010034888 | A1 | 2010 Apr. 01 | Paakkinen |

Field of Use

The present invention relates to turbines which convert a prime source of power to powerful rotation and more specifically to turbines which utilize gravitational and inertial forces applied on an eccentrically rotating mass.

Description of the Prior Art

In prior art, a rotator eccentrically mounted for rotation on an upright shaft and having its center of gravity at a distance from the shaft, has been used to produce electrical power utilizing ocean waves as a prime mover. Typically, a hollow floating structure, buoy or vessel provides the base where the upright shaft is supported. In most cases the rotating mass or pendulum having a weight attached at its distant end from the shaft is completely enclosed in the floating base for protection from the sea water. The waves rock the floating structure imparting the motion to the shaft, where the mass is mounted for rotation. The upright shaft moves from its position, forward and backward, or left and right or up and down in a linear or rotational direction causing the rotational displacement of the eccentrically rotating mass, which moves to a new position due to gravitational and inertial forces. Unfortunately, most of the times, the mass oscillates and only occasionally it rotates. Full rotations are difficult to succeed due to the randomness of the wave parameters. One wave may set the mass in rotation and the next may stop it, by generating rotation preventing forces. Devices, in prior art, aimed to avoid rotation preventing forces and "help" the mass into full rotations. U.S. Pat. No. 8,915,077 and patent application no. 2015/0123406 disclose floating structures of particular designs including a fixed upright shaft and a rotator. These structure have very specific designs and substantially large dimensions, in relation to the rotating mass. They are designed to produce beneficial inclinations and corresponding forces to "help" the rotator rotate in full circles. However, the stochasticity of the wave train is still not avoided, rocking the vessel, stochastically, and relaying corresponding movement to the shaft. WO2010034888 and U.S. Pat. No. 7,375,436 describe devices that aim to "help" the mass succeed full rotations, in different ways. They include gyroscopes, powered continuously to high rpm, in order to provide "the extra push" to the mass and bring it closer to a full rotation, through precession torque. This "gyroscopic push" constantly consumes power and its effect may still not be potent enough to overcome undesirable gravitational and/or electrical load based, rotation preventing forces.

U.S. Pat. No. 7,453,165 describes a device for harnessing the power of ocean waves through a buoy, which supports a pendulum mounted on a vertically oriented central shaft, fixed on the body of the buoy to directly receive its movements. Again, the buoy imparts all desirable and undesirable movements to the shaft.

The undesirable or rotation preventing motion of a vessel occurs when an instant wave moves the vessel, and inevitably the shaft, bringing it to a position that creates an "up-hill" for the rotating mass. Even worse is when the wave arrives at a time that the mass is in rotational deceleration "running out" of a previously developed angular momentum.

The ideal condition for the mass rotation is to always have a "down-hill" ahead. It is an object of the present disclosure to generate "down-hill" conditions, most of the times.

The "down-hill" conditions occur when the shaft provides an inclination to the mass, which generates a beneficial for the rotation torque, due to gravity. This torque is at maximum, when the lowest point of a "down-hill" is 90° ahead of the current position of the mass. Other forces, such as inertial forces, generated from the movement of the shaft, in multiple translational or rotational directions, may also benefit the rotation.

U.S. Pat. No. 4,843,250 describes a buoyant vessel of a circular form with a pivot shaft of a lever arm having a weight at the end thereof. The weight is freely rotatable in either direction through 360 degrees. The lower end of the shaft is coupled to a piston type hydraulic pump, which draws fluid from a reservoir and activates a hydraulic motor to create electricity. U.S. Pat. No. 8,456,026 describes a gyroscopic device which can be used as a power generator utilizing natural wind or wave motion to induce processional rotation in a gyroscopic device. Processional rotation is also the object of U.S. Pat. Nos. 4,352,023, 7,003,947 and 7,375,436. U.S. Pat. No. 6,876,095 describes a generator which produces electrical power. The apparatus includes a main shaft with a weight element coupled to an end of the shaft. The weight is supported at a distance from the axis of the shaft to generate angular momentum upon movement of the end of the shaft on a cyclical arc path. This path belongs to one plane. A tangential force is applied to the shaft generated by a motor. The shaft is restricted to rotate only in one plane and about only one axis, being limited in contributing additional forces, during a full rotation, that would make the weight's rotation more powerful and substantially increase its power generation capability.

A floating vessel, disposed to ocean wave activity, can move in up to six degrees of movement freedom. These are three translations, forward/backward (surge or Translation on the x-axis: $T_x$), left/right (sway or Translation on the y-axis: $T_y$), up/down (heave or Translation on z-axis: $T_z$), and three rotations, pitch (rotation about the forward/backward axis: $R_x$), roll (rotation about the left/right axis: $R_y$) and yaw (rotation about the up and down axis: $R_z$).

Flight simulators or amusement ride capsules supported by motion bases can move in up to six degrees of freedom, as well. It is known in the art, that motion bases can be classified according to whether the motion can be carried out by independent motion producing stages, stacked upon each other, called "stacked" motion bases, or by a single platform, supported on a plurality of actuators, rams, or "legs", utilizing the principles of parallel kinematics, called "synergistic" motion bases.

The independent motion stages in a "stacked" motion base can be implemented by stacking simple machines such as linear slides, pivots and swivels, which are activated independently, by a corresponding actuator. A linear slide, for example, may include a base, straight-line bearings on the base, a platform that moves in a straight line along the bearings and actuators such as hydraulic cylinders or sprocket and chain, which when activated can provide a translational motion to a body attached on its platform. Similarly, a pivoting platform can provide a rotational motion.

The synergistic motion base consists of a part securely fixed and a part that can be linearly moved, through a limited distance or rotated through a limited angle. The movement of the one part of the base relative to the other is usually produced by extensible actuators or rams.

A motion base is also classified according to the number of degrees of movement freedom, or simply degrees of freedom, or the directions in which it can move. The Stewart platform, well known in the art, is a synergistic motion base which can provide six degrees of freedom.

Actuators include hydraulic rams, electrical actuators, such as rotary electric motors without or with a gearing system, which can impart high torque etc. Recently developed actuators include efficient pneumatic rams and electromagnetic rams, a form of dual action linear motor in which a piston moves freely in a cylinder like a hydraulic cylinder.

U.S. Pat. No. 7,484,460 claims a decouplable, movable track section of an amusement ride path and "a motion base supporting the movable track section and the motion base being configured for moving the movable track section in a direction along any of three coordinate axes, or any combination thereof, while also being configured for carrying out pitch, roll and yaw motions with the movable track section when the movable track section is decoupled."

SUMMARY

A turbine comprises a shaft being vertical in non-operative position, a mass eccentrically mounted for rotation about and in a perpendicular plane to the shaft, having its center of gravity at a distance of the shaft and a motion base rigidly supporting the shaft, being configured for moving the shaft in any of the directions of at least one set of two degrees of movement freedom, selected from the following degrees of movement freedom: pitch, roll, yaw, surge and sway.

The turbine provides with embodiments functional both in land and ocean. Prime movers such as actuators or even a prime source itself, such as ocean waves, provide with motion which activates a "stacked" or a "synergistic" motion base. A control system optimizes motion base's movements for the creation of beneficial gravitational and/or inertial forces to the eccentrically rotating mass.

LIST OF FIGURES

FIG. 9a shows a perspective view of a preferred embodiment of the turbine including an external prime source of power and a control means with sensors.

FIG. 9b shows a closed loop control diagram.

FIG. 14a shows a floating turbine with a ballast tank.

DETAILED DESCRIPTION

Figure 1:
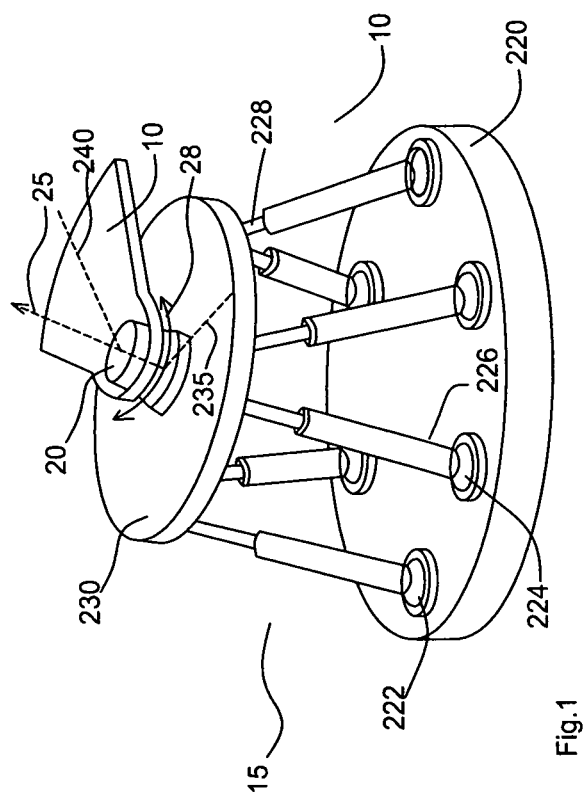
FIG. 1 shows a perspective view of a preferred embodiment of the turbine utilizing the eccentrically rotating mass at an instant of a beneficial inclination.

The present disclosure describes a turbine, utilizing a mass, eccentrically mounted for rotation, about a shaft in a perpendicular to shaft's main axis, plane. The mass has its center of gravity at a distance from the shaft. The mass rotation is facilitated with the use of bearings. The shaft, in one preferred embodiment, has a vertical non-operative position and is supported rigidly, not to rotate, on a moving platform of a motion base. In operation, the motion base provides to the shaft translational and/or rotational movements at a limited range of motion, causing the shaft to deviate from its initial vertical position. In another, preferred, embodiment the shaft is supported by a pivoting platform supported by a pivot, providing pivoting to the pivoting platform about a horizontal axis. The pivot is fixed on a second platform which limits the pivoting range of the pivoting platform to a small angle. The second platform is a motion base of the "synergistic" or "stacked" type. Shaft's deviation from the vertical position generates gravitational forces on the mass, which cause its rotation. Also, acceleration, deceleration and stopping of the shaft, generates inertial forces. The turbine disclosed can utilize both gravitational and inertial forces to have its mass rotate.

The turbine described, herein, can be used in land or offshore on a dedicated vessel or other ships, near-shore under the surface of the water or on shore, with great efficiencies. A control system with sensors may also be included to optimize the mass' angular momentum, by controlling the gravitational and/or inertial forces provided by the shaft to the mass. In ocean applications the control system, in addition, monitors the characteristics of the current wave, and if needed, the upcoming wave's as well, by having sensors disposed on the ocean surface, in proximity to the vessel-turbine. The control system monitors the mass' rotational parameters, such as angular velocity and momentum as well as the current and/or the upcoming wave characteristics, such as height, period and speed. It also monitors the upcoming possible shaft position, such as elevation, angle, rotational or translational speed or acceleration depending on the characteristics of the monitored waves. The load of turbine from compressor applications or electrical generation, is also monitored. The ocean control system compensates undesirable upcoming "up-hills" and creates the conditions for "down-hills" instead, by moving the shaft's position, accordingly.

Multiple controlled movements of the shaft can benefit the mass' rotation. However, at minimum, the movement of the shaft in the directions of at least two degrees of freedom can generate sufficient forces to the shaft for a powerful mass rotation, substantially more beneficial from the mass rotation that would have been derived by providing forces to move the shaft in the directions of only one degree of freedom. For example, it is more beneficial to surge and roll the shaft, within the same cycle, instead of only applying one of the two rotations. Similarly, it is more beneficial to provide pitch and roll or surge and pitch to the shaft, instead of only one movement from the pair of movements, mentioned, per cycle. Movements in the directions of heave would require substantial inclinations of the shaft to be beneficial, and is not being examined in the present disclosure. Below, the beneficial combinations by two are examined:

1) All combinations, by two, of $R_x$, $R_y$, $R_z$. Pitch and Roll can create "down-hills" which "help" the rotating mass' angular momentum. When a "down-hill" travel of the mass is over, the "difficulty of an up-hill", for the rotation, may begin. Yaw rotational motion applied to the mass can provide the additional "push", to add to the mass' angular momentum and "help" it overcome this "difficulty".

2) $T_x$-$R_y$, $T_y$-$R_x$, $T_x$-$R_x$, $T_y$-$R_y$. Similarly to the above, Surge can fortify the rotating mass to overcome an "up-hill" created by Roll and Sway can "help" overcome an "up-hill" created from Pitch. Similarly, Surge and Pitch provide more angular momentum, through inertial and gravitational forces, in comparison to applying only one them. The same holds for Sway and Roll.

3) All combinations of $T_x$, $T_y$, $R_z$. Surge and Sway can maintain a powerful angular momentum of a mass through inertial forces, without necessarily needing a "down-hill" benefit. Of course, a "down-hill" benefit can be added to them as an extra "help", but this is the "at least two" list! Similarly, Yaw, applied in combination with Surge or Sway, adds an additional benefit to the mass rotation.

Overall the beneficial combinations are as follows: pitch-roll, pitch-yaw, roll-yaw, surge-roll, sway-pitch, surge-pitch, sway-roll, surge-sway, surge-yaw, sway-yaw. These, though, are all the possible combinations by two, from all beneficial degrees of movement freedom.

Referring now to the drawings in which like reference numerals are used to indicate the same related elements, FIG. 1 shows a preferred embodiment of the turbine. It shows an eccentric mass 10, mounted for rotation, indicated by arrows 28. Mass 10 is freely rotatable in either direction through 360 degrees about shaft 20 and its main axis 25. The rotation is facilitated by bearings (not shown). The rotational plane of mass 10, about shaft 20, is perpendicular to shaft's main axis 25. The center of gravity of mass 10 is at a distance from shaft 20.

Shaft 20 receives motion from motion base 15. Motion base 15 includes a shaft support 230, for supporting shaft 20, a fixed base 220 and actuators, such as 226 and 228. The actuators connect the underside of shaft support 230 (not shown) to fixed base 220 and impart movement to shaft 20. The actuators, such as 226 and 228 are connected via spherical bearings such as 222 and 224, or equivalent structures such as multiple axis bearing assemblies, universal joints, ball joints, among others. These actuators drive motion base 15, synergistically, thus providing the desirable movement to shaft 20, which sets eccentric mass 10 in rotation.

FIG. 1 illustrates the instant at which the shaft support is creating a "down-hill" for mass 10. The lowest point of the inclination is indicated by radius 235, while mass 10's position is indicated by radius 240. Mass 10 will rotate "down-hill", from this beneficial position, with a maximum torque, which is generated by the gravitational forces exerted on mass 10, at this instant.

Control means (not shown), such as a programmable logic controller with sensors, monitors the dynamics of rotation of eccentric mass 10, which is slowed down by the load of the turbine, which resists rotation, such as compressor applications or electricity production (not shown). The control means provides feedback to motion base 15, which imparts optimized movements and inclinations to shaft 20 in order to have optimized forces applied on mass 10 and overcome the resistive forces of the load. At least two degrees of freedom, as mentioned above, can provide with powerful rotations.

Figure 2:
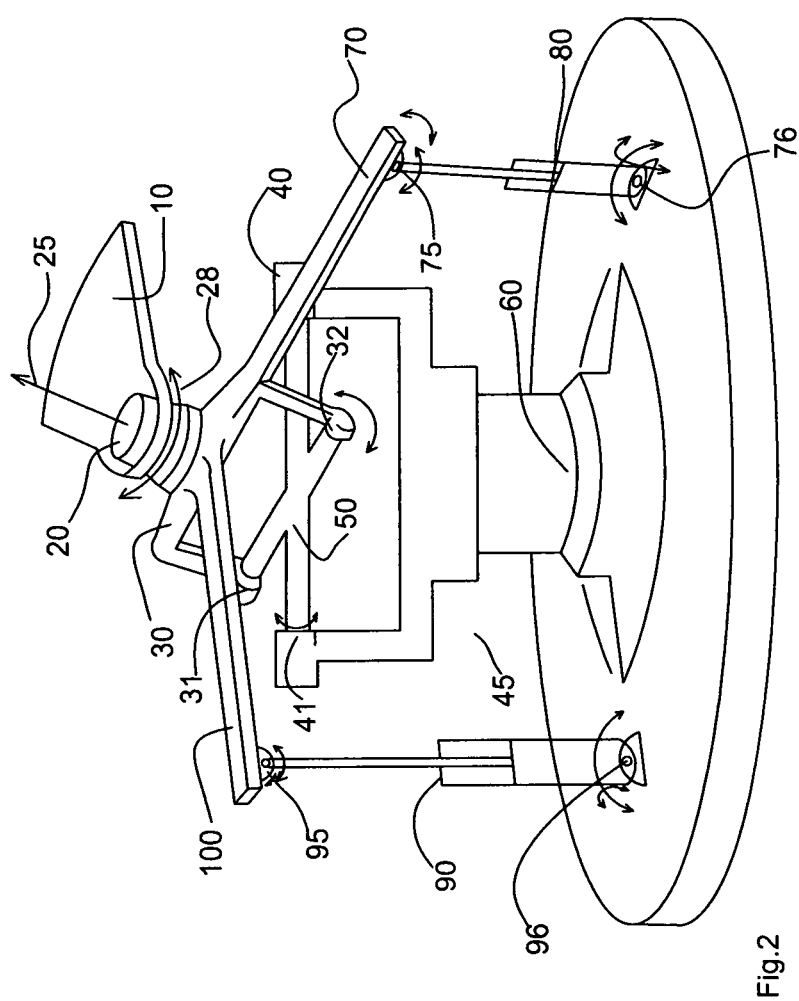
FIG. 2 shows a perspective view of a preferred embodiment of the turbine utilizing a vertical u-joint motion base.

FIG. 2 illustrates a preferred embodiment of the invention wherein motion base is the vertically oriented universal joint structure 45, which includes universal pivoting shaft support 30 and fixed pivot base 60 which are connected to each other with universal joint means, including pivoting cross 50, and actuators 80 and 90.

Universal pivoting shaft support 30 supports shaft 20. Cross 50 pivots about fixed pivot base 60 in points 40 and 41. Cross 50 also allows pivoting of universal pivoting shaft support 30 in points 31 and 32. Actuators 80 and 90 connect universal pivoting shaft support 30's extensions 70 and 100, to fixed pivot base 60, for imparting movement to universal pivoting shaft support 30 and shaft 20. Actuators 80 and 90 are connected via universal joints, 75, 76 and 95, 96, or equivalent structures such as multiple axis bearing assemblies, spherical joints, ball joints, among others.

This preferred embodiment provides movement to universal pivoting shaft support 30 in pitch and roll directions in relation to fixed pivot base 60. These rotational movements of universal pivoting support platform 30 provide universal inclinations to shaft 20, thus generating gravitational and inertial forces to mass 10, which can develop high angular velocity and momentum, thus providing powerful rotations.

Preferred embodiments of the turbine disclosed, such as the ones shown in FIG. 1 and FIG. 2 can be used in ocean applications, as well, being secured on a floating vessel, totally enclosed for protection from the sea water.

Figure 3:
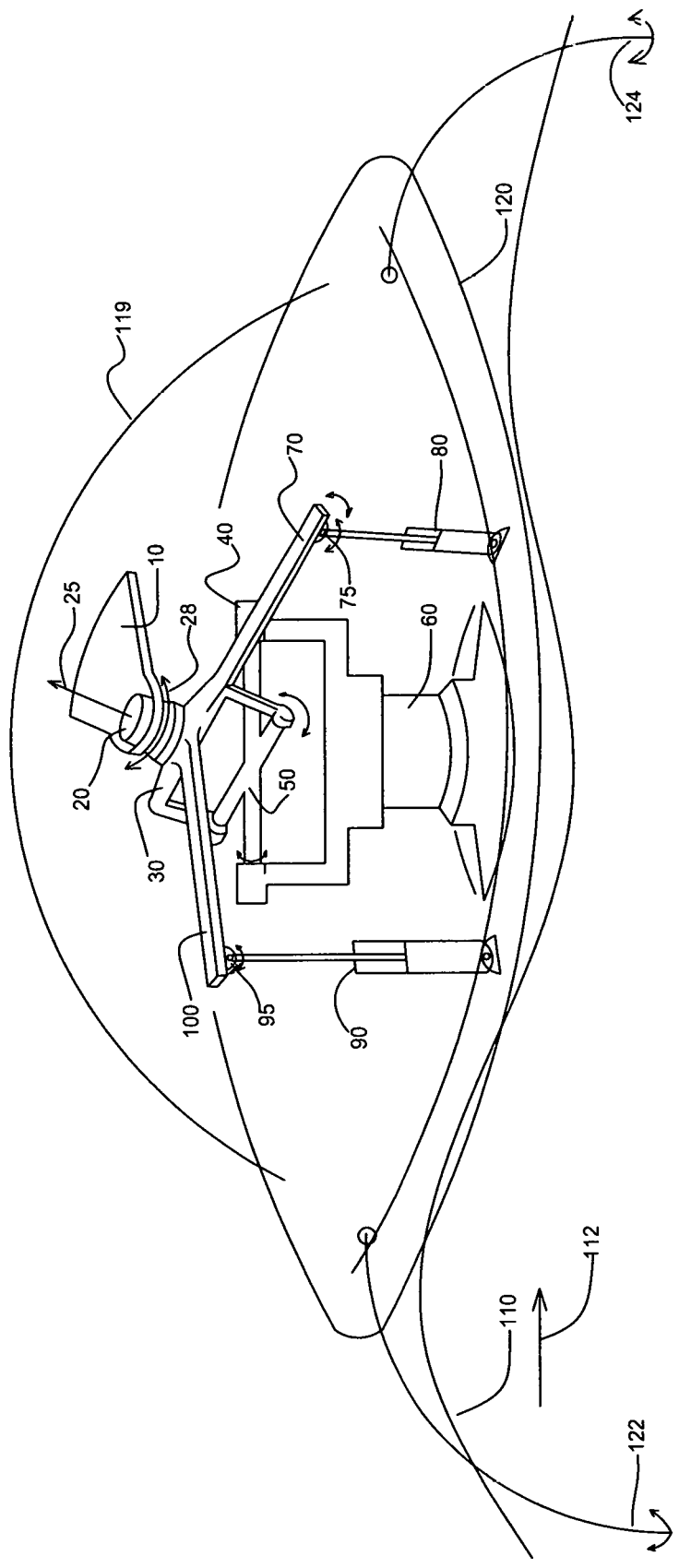
FIG. 3 shows a perspective view of a preferred embodiment of the turbine in the ocean protected from harsh conditions in a vessel.

FIG. 3 shows a preferred embodiment of the turbine operating in the ocean. It utilizes the vertically oriented universal joint structure 120, shown in FIG. 2, completely enclosed in floating vessel 120, by vessel's roof 121. Vessel 120 is disposed in ocean waves 110, which move in the direction indicated by arrow 112. The waves move vessel 20, which moves shaft 20. As a result, shaft 20 is forced to incline and mass 10 starts rotating. When an "up-hill" for mass 10 is about to occur, actuators 80 and 90, provide with an inclination, at any plane, favorable to mass 10's rotation. Another preferred embodiment uses, in addition, mooring means, such as anchors 122 and 124. Furthermore, in another preferred embodiment, control means (not shown), including sensors for predicting the parameters of the upcoming waves, disposed around vessel 120, provide feedback for optimized mass 10's rotation. Other preferred embodiments may include different shapes of vessels.

Figure 4:
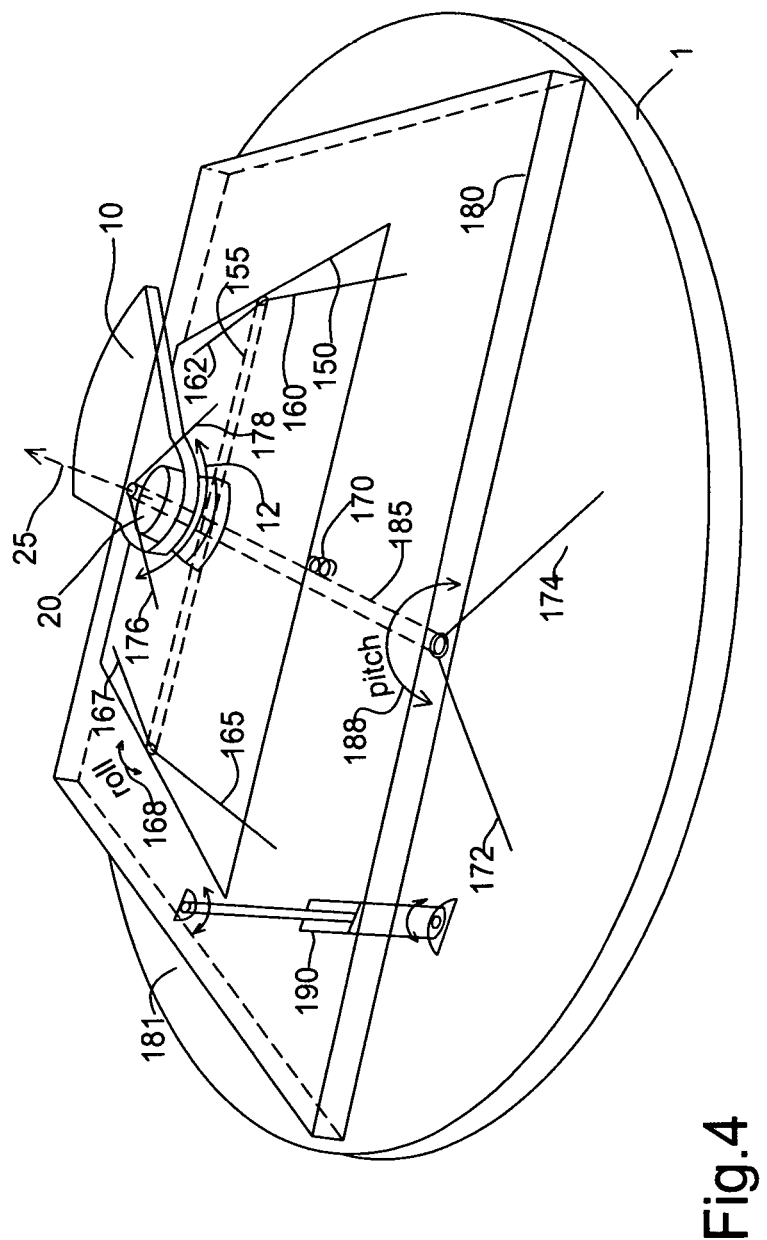
FIG. 4 shows a perspective view of a preferred embodiment of the turbine utilizing a pivoting support for the eccentrically rotating mass.

FIG. 4 illustrates another preferred embodiment of the turbine comprising pivoting platform 150, pivoting on horizontal pivot shaft 155, which is supported with pivot supports 160, 162, 165 and 167 on motion base 181. Pivoting platform 150 supports shaft 20 and eccentric mass 10. Shaft 20's main axis 25, crosses horizontal pivot shaft 155.

Motion base 181 is a one-stage motion base providing pivoting to pivoting platform 150. The position of pivoting platform 150, which supports shaft 20, depends only partially on the movement of motion base 181. That is, motion base 181 does not fully control shaft's 20 position as it was the case in the previous preferred embodiments.

Motion base 181 comprises fixed base 1, base support 180, which is pivotally supported on base pivot shaft 185, which, in turn is supported on fixed base 1 with pivot support members 172, 174, 176 and 178. Motion base 181, further comprises actuator 190. Actuator 190 is connected to fixed base 1 and the underside of base support 180 with rotational joints 192 and 194. Actuator 190 imparts rotational motion to base support 180.

Pivoting platform 150 is arranged for a limited range of pivoting motion, which stops when it reaches base support 180. Cushioning means, such as spring 170, may be used to absorb the impact of stopping.

Horizontal pivot shaft 155 is arranged to be perpendicular to base pivot shaft 185. Mass 10, in its non-operative position has pivoting platform 150 leaning on one side. When Actuator 190 starts pivoting base support 180, mass 10 begins to rotate. When mass 10 passes over horizontal pivot shaft 155, mass 10's weight pivots pivoting platform 150 on its other side. When this happens, a "down-hill" position is created for mass 10's providing maximum torque for mass 10's rotation. This "helps" mass 10 to develop angular momentum.

Another preferred embodiment (not shown) includes pivoting platform 150, pivoting on top of a motion base with more than one degree of freedom. Yet, another preferred embodiment has pivoting platform 150 pivoting on a synergistic motion base, such as the one illustrated in FIG. 1.

Figure 5:
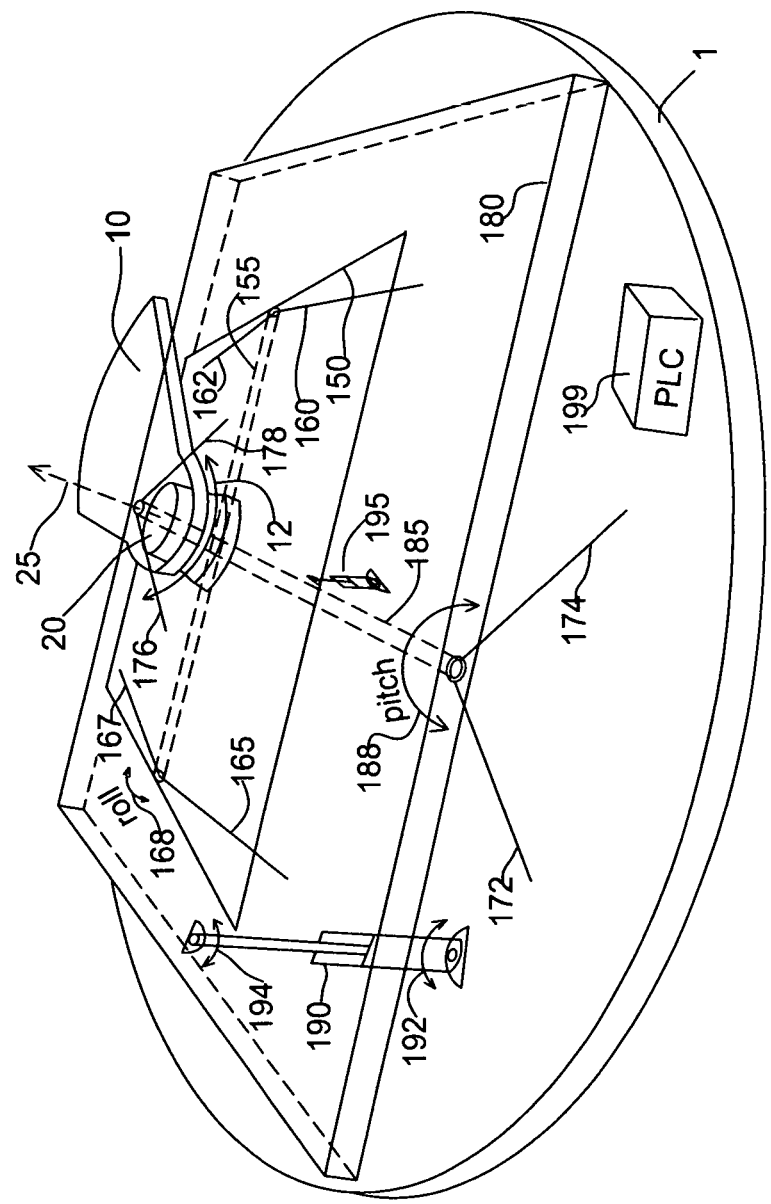
FIG. 5 shows a perspective view of a preferred embodiment of the turbine utilizing a pivot support for the eccentrically rotating mass with an actuator.

FIG. 5 shows the turbine shown in FIG. 4, further including actuator 195, connecting base support 180 to pivoting platform 150, with rotational joints. Actuator 195 optimizes mass 10's rotation, by controlling the pivoting of pivoting platform 150. Control means 199 monitor mass 10's angular momentum and controls the activation of actuators 190 and 195, in a coordinated manner to optimize mass 10's rotation.

Figure 6:
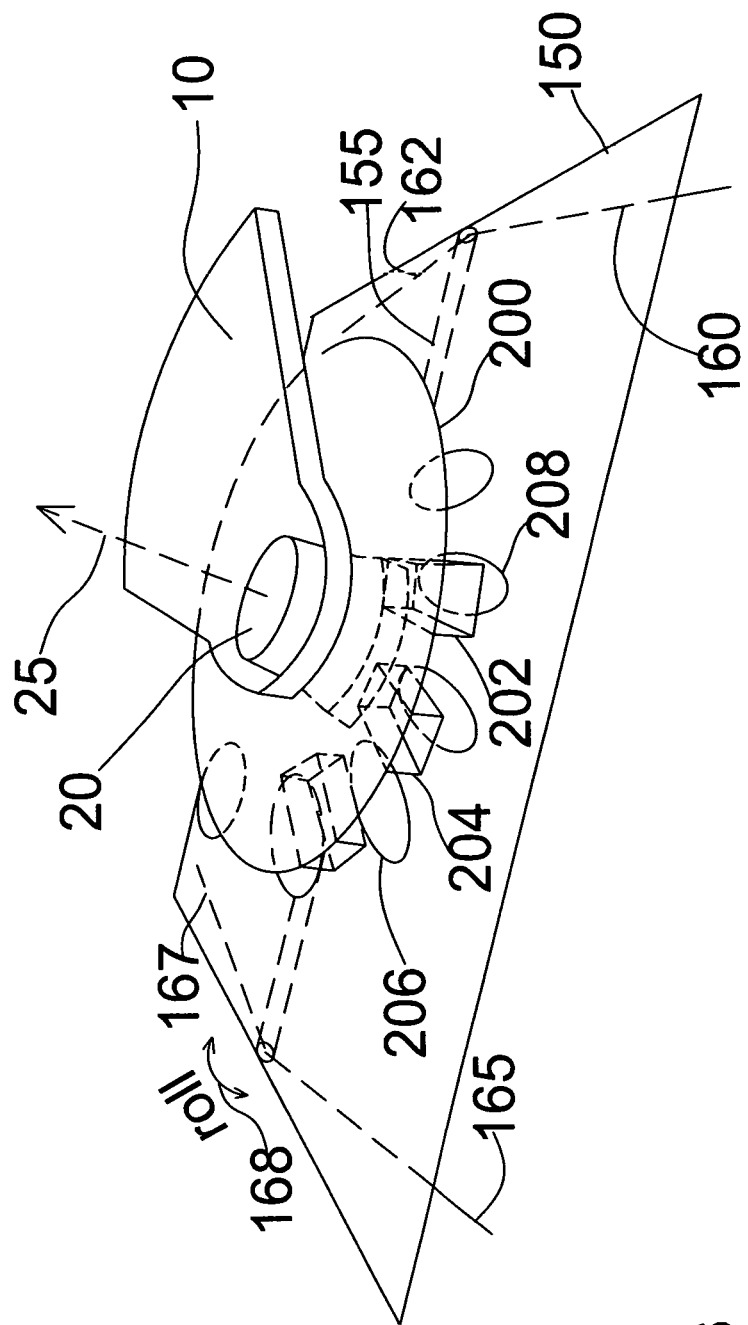
FIG. 6 shows a perspective view of an axial flux electromagnetic rotational generator used with the turbine.

FIG. 6 illustrates an electrical generator added between pivoting platform 150 and mass 10. The generator includes disc 200, which is in rotational communication with mass 10. Disc 200 has in its underside attached magnets such as 202 and 204, with proper polarity arrangement and magnetic field direction, facing coils 206, 208. The coils are supported by pivoting platform 150. When mass 10 rotates, the coils produce electricity. This is an implementation of an axial flux generator. This generator pivots along with shaft 20, in direction, 168. Other embodiments (not shown) have a stator attached on shaft 20, while having the rotor in rotational communication with the eccentric mass 10.

Figure 7:
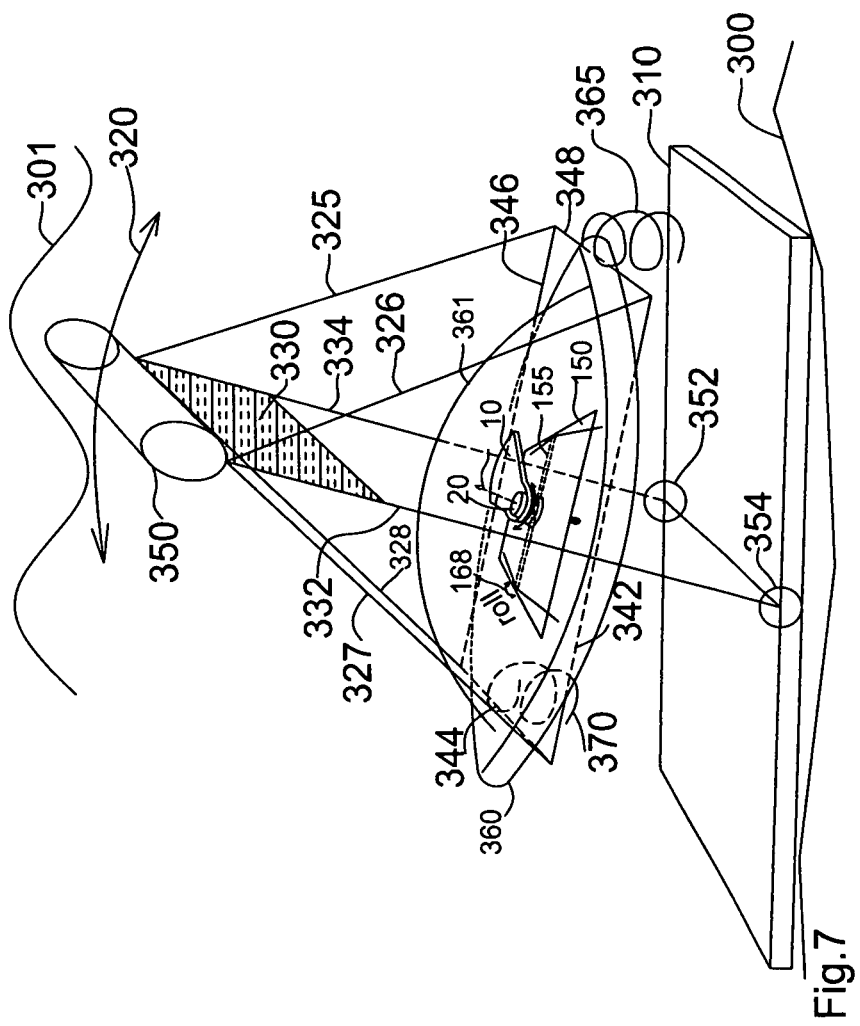
FIG. 7 shows a perspective view of a preferred embodiment of the turbine in a near-shore underwater operation.

FIG. 7 illustrates a preferred embodiment of the turbine in underwater operation, near-shore. The eccentric mass rotating mechanism is enclosed in a buoy, supported by beam means, which pivots about a horizontal pivot, provided by a fixed base in the ocean floor. More specifically, submerged buoy base 360, completely covered and protected by sea water with buoy roof 361 fully encloses all eccentric mass rotation mechanism and pivots shown in FIG. 4 (shown only partially here). Underwater fixed platform 310 is secured on the ocean floor 300. Vertical beam means such as pivoting frame comprising rods 332 and 334, is connected on the buoyant panel assembly, which here includes panel 330 and float 350. Included in the beam means, supporting frame 342, 344, 346, 348 securely supports submerged buoy base 360. Pivot points, or hinges 352 and 354, pivotally support rods 332 and 334. The buoyant panel is disposed to receive the surge motion of ocean waves 301. When ocean surge moves the buoyant panel, the beam means pivots in directions 320. S to springs 365 and 370 may be used to provide limited range of pivoting.

This embodiment, although in different scale and environment utilizes analogous functional elements as in previous embodiments, that is: (i) a base support for the pivoting platform, shaft and rotating mass mechanism (submerged buoy base), (ii) a base pivot (beam means), (iii) a fixed base (underwater fixed platform) and (iv) an actuator (buoyant panel). The waves' surge is the prime source of power, here, as, for example, electricity powers an electric actuator.

Figure 8:
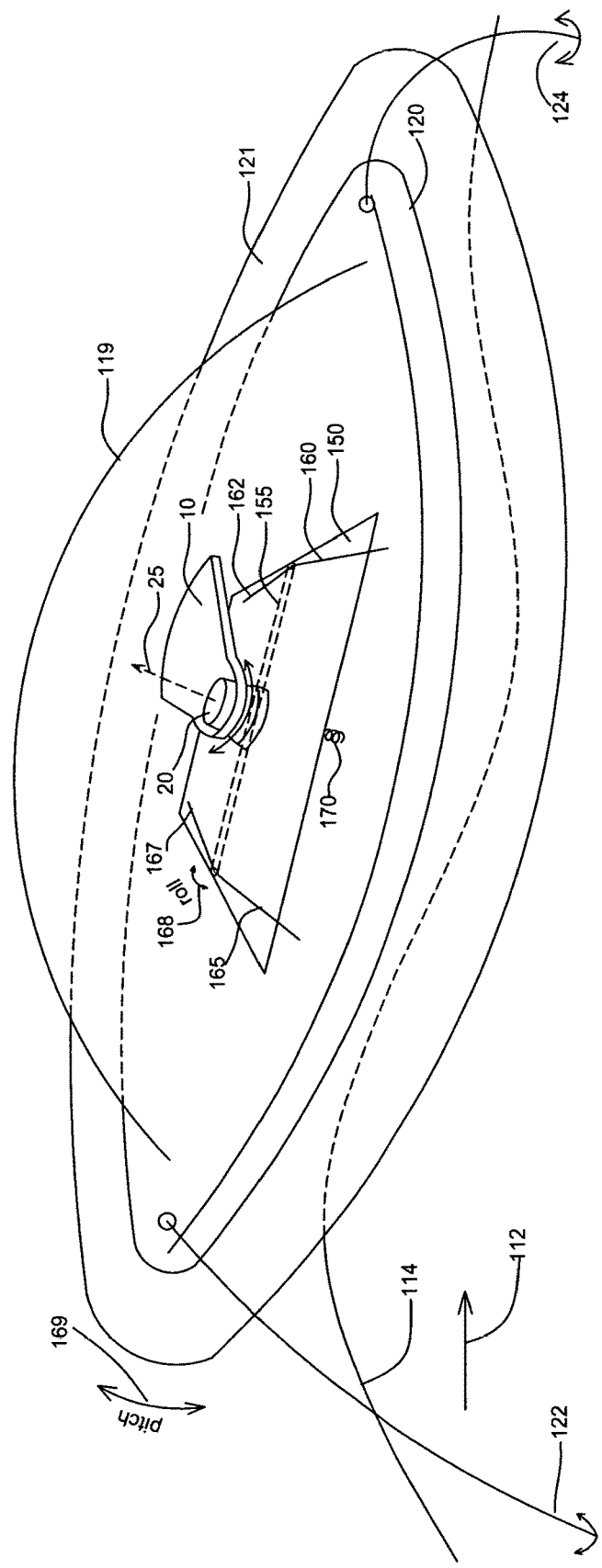
FIG. 8 shows a perspective view of a preferred embodiment of the turbine operating in the ocean utilizing a pivoting support for the eccentrically rotating mass.

FIG. 8 illustrates a preferred embodiment operating on the ocean surface. Pivoting platform 150 is pivotally supported by pivot support members 160, 162, 165 and 167, which are fixed on vessel 120, as shown. Pivoting platform 150 supports shaft 20 and mass 10, which rotates about shaft 20. Vessel 120 is moored with mooring means such as anchors 122 and 124, to maintain horizontal pivot shaft 155 substantially parallel to the direction of waves 112. Pivoting platform 150 rolls in directions 168, at a restricted range of pivoting motion limited by the vessel's floor. Cushioning means, such as spring 170 can be used to absorb the impact of platform 150's stopping, in both sides of its pivoting. Waves 114 impart pitching motion to vessel 120 in the direction 169. Vessel 120 imparts the same pitch motion to shaft 20. When the waves pitch vessel 120, mass 10 starts rotating about shaft 20. When mass 10, passes on top of horizontal pivot shaft 155, pivoting platform 150 rolls in its other side, instantly providing a "down-hill" with maximum torque for mass 10, in a direction substantially perpendicular to the direction 114 of the waves. Therefore, shaft 20 is provided with the capability of inclining towards the pitch and roll directions, in a coordinated way, so that mass 10 completes full rotations, instead of oscillations.

Roof 119 totally encloses pivoting platform 150, shaft 20 and mass 10, protecting them from sea water. In addition, a tube float such as tube float 121 can be securely attached on vessel 120's body, surrounding vessel 120, as shown in FIG. 8. Tube float 121 is used to keep vessel 120 substantially horizontal, when floating in still water.

Another embodiment further includes an actuator, similar to actuator 195, shown in FIG. 5 connecting the underside of pivoting platform 150 with vessel's floor with rotational joints and control means and sensors for monitoring wave characteristics, turbine load and mass 10's position and rotational dynamics, such as angular velocity and momentum. Control means controls the operation of actuator 195, which optimizes the pivoting angle, position and dynamics, such as speed of raising or lowering pivoting platform 150, in order to provide mass 10 an optimized rotation. Another embodiment further includes additional actuators for better stability and pivoting of pivoting platform 150. Another embodiment further includes a swivel supported on vessel 120, supporting the eccentric mass mechanism, in order to modify the alignment of pivoting platform 150, if needed, depending on the waves' direction.

The following 3 paragraphs below contain text exactly as shown in Provisional Patent application 62/210,455, submitted by the present inventor. This prov. appl. was in the Cross-Reference to Related Applications section of patent application Ser. No. 15/193,104 as well as the present application. The text clearly recites that the source of power to the turbine, mentioned throughout this application and application Ser. No. 15/193,104 is an external to the turbine, power source: 62/210,455, Description, $2^{nd}$ § "This secured support with the universal pivoting capability is subjected to the forces of an external prime source of power and constitutes the secured universal pivoting support means. The secured universal pivoting support means may be a universal joint (also called u-joint or Cardan joint) including more than two hydraulic pistons connected in a manner to provide tilting to the u-joint at more than one plane. In this case the prime source of energy is compressed fluid. Another secured universal pivoting support means may be embodied by a tripod consisting of three piezoelectric or electro-active polymer actuators supporting a platform with a hole in the middle. This hole is the preparation where a miniature eccentric mass can be bearing-mounted. When voltage is supplied to these actuators—tripod legs, they can cause the inclination of the platform's level and the eccentric mass' rotation. In this case the prime source of energy is voltage. Prime source of power can also be the human arms causing the inclination of the secured universal pivoting support means."

Also 62/210,455 pg 16, $1^{st}$ §: "In another preferred embodiment, compressed fluid is used as a prime source of energy, which is provided through a combustion process or wave point absorbers, such as wave bobbing buoys connected to pistons, well known in the art. In the latter case, the turbine's adjustable platform is secured through a secured universal pivoting support means utilizing a u-joint mechanism on a secure sea platform supported by the bottom of the sea. Around the sea platform, wave energy converting buoys generate fluid under compression, through hydraulic means, which is used as prime source of power for the secured universal pivoting support means".

Also 62/210,455 pg 14, penultimate §: "prime power source is applied at discrete instances and not continuously, thus making the Dynamically Adjustable Rotational Level of the Eccentric Mass (DARLEM) turbine very efficient. Such a source of power can be a combustible fuel, i.e. natural gas, or a clean renewable source such as the ocean waves."

In addition, 62/210,455 drawings: FIG. 4, FIG. 6 and FIG. 9, clearly show that the prime source of power is external and it can be supplied by a variety of methods as mentioned above, including a compressed fluid, natural gas and ocean waves. FIG. 9a, of the present application illustrates this external source of power 299, as also it was shown in 62/210,455 appl. FIG. 6. In addition, FIG. 9a shows the control means 199 (PLC with sensors), as it was also shown in FIG. 5 of application Ser. No. 15/193,104 and FIG. 8 of prov. appl. 62/210,455.

FIG. 9 b of the present application shows the diagram of the control means, as it was described in application Ser. No. 15/193,104, pg. 10, $1^{st}$ and $2^{nd}$ full §: "FIG. 1 illustrates the instant at which the shaft support is creating a "down-hill" for mass 10. The lowest point of the inclination is indicated by radius 235, while mass 10's position is indicated by radius 240. Mass 10 will rotate "down-hill", from this beneficial position, with a maximum torque, which is generated by the gravitational forces exerted on mass 10, at this instant. Control means (not shown), such as a programmable logic controller with sensors, monitors the dynamics of rotation of eccentric mass 10, which is slowed down by the load of the turbine, which resists rotation, such as compressor applications or electricity production (not shown). The control means provides feedback to motion base 15, which imparts optimized movements and inclinations to shaft 20 in order to have optimized forces applied on mass 10 and overcome the resistive forces of the load. At least two degrees of freedom, as mentioned above, can provide with powerful rotations. "Also, in pg 8, $1^{st}$ full §: " . . . the control system monitors the . . . angular velocity".

The block diagram of FIG. 9b shows a feedback control system designed to achieve a desired angular velocity. The desired angular velocity's set point (S.P.) value is entered in the controller. The measured angular velocity and the current position of the mass are retrieved by the controller from the sensor which monitors the dynamics of the mass rotation. The measured angular velocity at current position is subtracted by the S.P., and the resulted error is used by the controller to adjust the positioning of shaft 20, through the repositioning of the motion base's support platform 230. The controller can instruct the motion base, according to the error, to provide an inclination for the mass to follow, such as the "downhill" discussed in the above paragraph.

Figure 10:
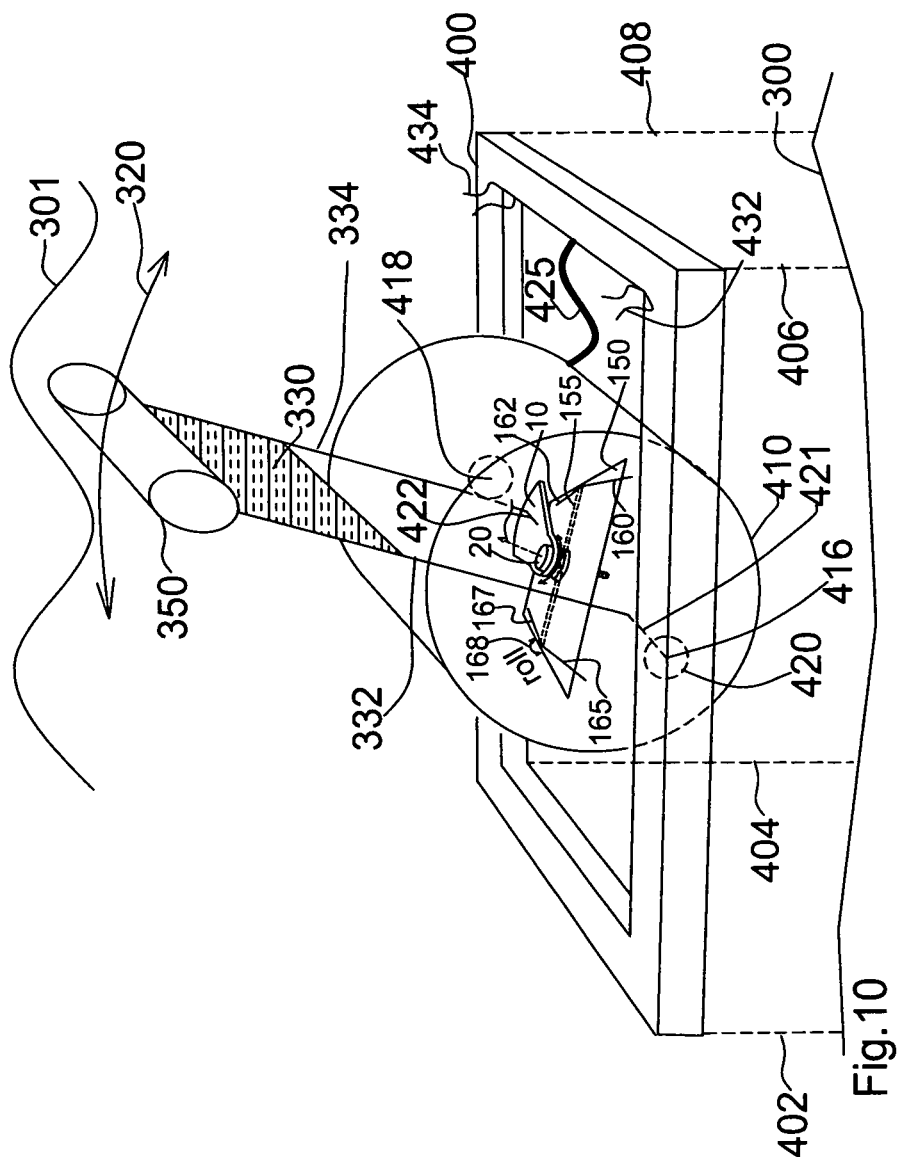
FIG. 10 shows a preferred embodiment of the turbine utilizing a submerged floating frame, supporting a buoy.

FIG. 10 shows a preferred embodiment of the turbine in an underwater operation, offshore. Submerged floating frame 400 is moored to the ocean floor 300 with mooring lines 402, 404, 406 and 408. Buoy 410 is pivotally supported on frame 400, with pegs 421 and 422 which are fixed on buoy 410's outer surface. The eccentric mass mechanism is entirely enclosed inside buoy 410, as shown in this figure and described in more detail in FIG. 7's description above. The mechanism's supporting legs 160, 162, 165 and 167 are fixed on buoy 410's lower internal wall. Frame 400 is moored so that the horizontal pivot shaft 155 is substantially parallel to wave direction. The wave surge power is the external source of power used in this embodiment. The wave surge forces are exerted on the buoyant panel. The buoyant panel can be a single hollow panel or a panel assembly of panel 330 and float 350. The buoyant panel is securely mounted on buoy 410 and keeps shaft 20 in a substantially upward position, in still water. The wave surge forces the buoyant panel to pivot back and forth in the directions of arrows 320. Along with the buoyant panel, buoy 410 and the eccentric mass mechanism pivot as well. The back and forth pivoting sets eccentric mass 10 in rotation around shaft 20. Electricity can be produced by a permanent magnet generator, included inside the buoy and having its rotor rotatably connected to the rotating eccentric mass 10. FIG. 6 above shows such a configuration.

A preferred embodiment utilizes a stop to limit buoy 410's pivoting. A rope, an elastic belt or a spring can be used as belt 425. Another preferred embodiment uses as a stop, a brake mechanism applied on pegs 421 and 422. Such a brake mechanism can be a friction brake, compressed fluid brake and dynamic or regenerative motor brake, all well known in the art. FIG. 10 shows motor/generator 420 securely housed in frame 400. Motor/generator 420 is rotatably connected to peg 421, either directly or with gearing means. When the motor/generator is not in operation, peg 421 pivots freely about frame 400. When in operation, the motor/generator can limit buoy 410's pivoting working as a brake, such as a dynamic brake. It can lock, temporarily, the peg's rotation when the buoyant panel has reached a "dead" point, that is a point in which the buoyant panel is fully stopped and about to start moving in the opposite direction. This may happen if the mass has not already passed over shaft 155. The temporary immobilization of the buoy gives time to the mass to continue its rotation towards the direction it was heading, and due to momentum, pass over shaft 155. Then, the motor/generator can immediately release this momentary lock to the peg so that the buoyant panel starts pivoting in the opposite direction, "catching up" with the wave, now though, synchronized with the mass rotation.

Figure 11:
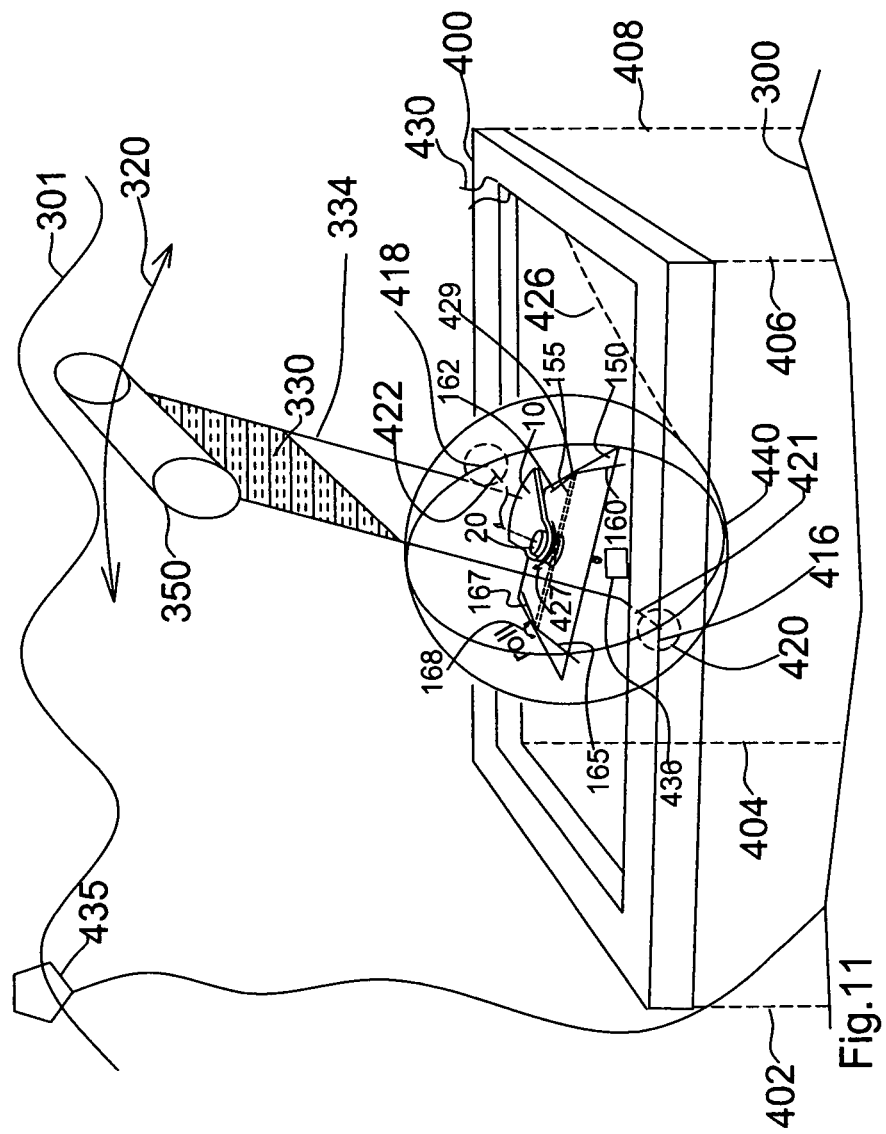
FIG. 11 shows a preferred embodiment of the turbine utilizing a submerged floating frame, supporting a spherical buoy.

FIG. 11 shows the eccentric mass mechanism enclosed in a spherical buoy. Here, belt 426 has reached its limit and therefore the buoyant panel has reached its rightmost dead-point position.

As FIG. 11 shows, mass 10, which at this instant is moving clock-wise, indicated by arrow 427, is not even in the proximity of shaft 155's right end 429, where the rotating mass was heading towards. If at this instant the buoyant panel starts moving at the opposite direction, this movement will exert to the mass forces opposing its clockwise rotation. Synchronization of the mass rotation with the buoyant panel's pivoting can occur by temporary immobilizing the peg, as mentioned above. Another way is to switch the production generator's mode to motor. That is to switch the operation of the generator shown in FIG. 6, to motor. This motor mode can rotate the mass clockwise to bypass shaft 155. Furthermore, an additional way to succeed synchronization would be to control the mass rotation through the decreasing or increasing the production generator's torque force.

Switching generator mode to motor happens when the generator's electric current direction, flowing through its coils, is reversed. However, by only decreasing or increasing the electric current, flowing through the coils, in generator's mode, this will control the torque force applied to the rotor. This follows the same principle as in regenerative braking. Regenerative breaking, occurs when the electric current going through the generator's coils does not switch direction but it is increased. When the current is increased, the back EMF (electromotive force) exerted on the rotor increases and the rotor now requires more effort to rotate. This decelerates the rotor. If the electric current going through the rotor coils does not change direction but only decreases, then the back EMF also decreases thus "easing" up the mass rotation. This control through this "regenerative mass rotation facilitation" will assist the turbine to: i) always provide power production, unlike the case of switching to motor mode, ii) not waste the energy when increasing the torque requirement overcome (regenerative braking) and iii) achieve efficient power production as many more full mass rotations will be succeeded in the various wave periods.

Figure 12:
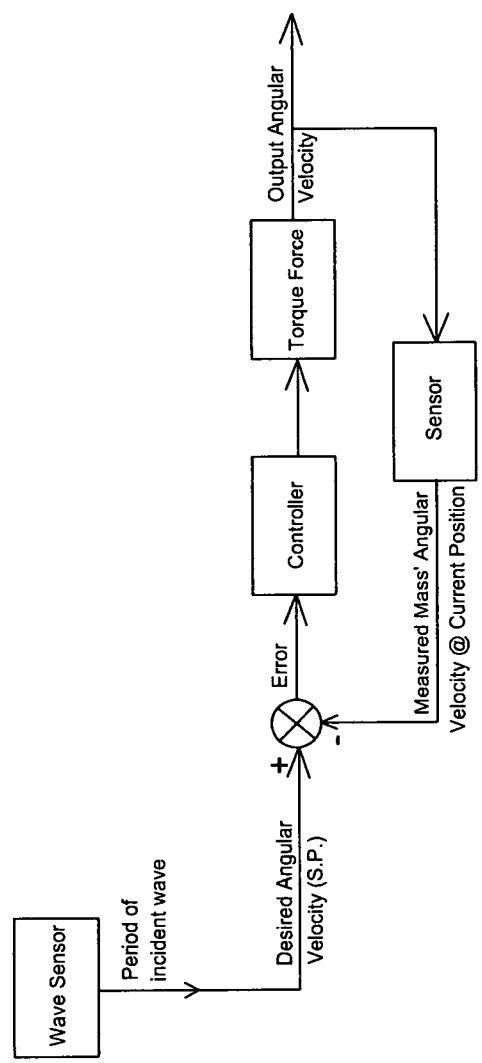
FIG. 12 shows a closed loop control diagram with a wave sensor.

FIG. 12 shows a control algorithm for controlling the mass' angular velocity through the "regenerative mass rotation facilitation" discussed above. An incident wave's characteristics sensor constantly senses the incident wave's period. This time period coincides with the time that it is desired for the mass to complete a full circle. Since this time is known, then the desired mass angular velocity for completing a 360 degree rotation during this wave, is also known. This desired angular velocity provides the set point (S.P.). The measured angular velocity provided by the control means sensor, shown as sensor in FIG. 12, is subtracted by the S.P. and the resulted error is entered in the controller. The controller output adjusts the production generator's torque force overcome requirement, according to the error, thus increasing or decreasing the mass angular velocity with the goal to match the desired angular velocity.

The previously mentioned motor/generator 420 of FIG. 10 can provide with an additional benefit during extreme weather conditions. In these conditions, motor/generator 420 can rotate the buoyant panel downwards until it reaches its home position, for protection. The home position is when the buoyant panel is "folded", and locked on frame 400. Latching means, such as locks 432 and 434, as shown in FIG. 10, are used to latch beams 332 and 334. An additional motor/generator (not shown) may be used, rotatably connected to peg 422, for redundancy and additional rotating force.

A preferred embodiment utilizes a buoy 410 in the shape of a solid of revolution. The solid of revolution is arranged to rotate around the solid's main axis. Solids of revolution do not displace water when rotate underwater, around their main axis. This provides with a significant efficiency advantage, as the force needed to pivot a buoy, underwater, is smaller for solids of revolution than in other solids, which require an extra force to also displace a water mass, while pivoting. Thus, in the embodiment utilizing a buoy with the shape of a solid of revolution, the area of the buoyant panel exposed to the wave surge can be smaller, resulting in a geometrically smaller and therefore more efficient overall turbine. An example of such a solid is the cylinder, shown as buoy 410, in FIG. 10 or spherical buoy 440, shown in FIG. 11, which is arranged to pivot about one of its diameters.

FIG. 11 also shows a wave surge characteristics' sensor 435 for sensing an incident wave's period, and a control means with sensors 436, which monitors the dynamics of mass rotation. Wave surge characteristics buoy/sensor 435 is floating on the ocean surface and moored in proximity to the turbine. The control means with sensors 436 is enclosed in the spherical buoy 440. Both are in control signal communication. This communication can be wired or wireless.

Figure 13:
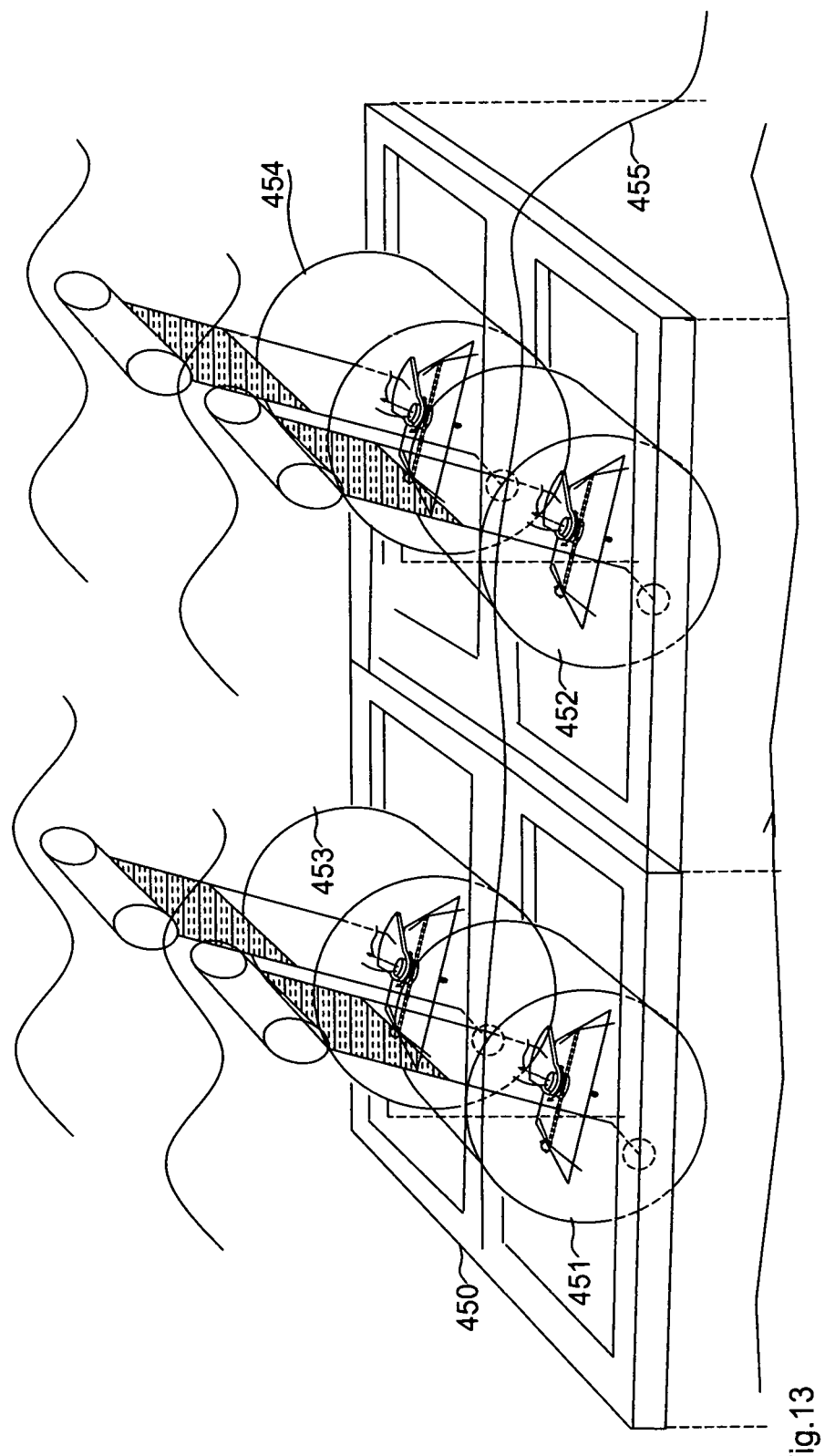
FIG. 13 shows an underwater electrical plant.

FIG. 13 illustrates an underwater power plant comprising a submerged floating frame, 450, which is moored to the ocean floor, as shown. Frame 450 supports a plurality of cylindrical buoy turbines, such as turbines 451, 452, 453 and 454, Each turbine contains the eccentric mass mechanism for electrical power production, as shown in FIGS. 10 and 11. Each cylinder further includes an electrical power production generator, as shown in FIG. 6. Also, each cylinder pivot pivots about a substantially horizontal axis, as shown. Submerged electrical cable 455 carries the electricity produced by all cylindrical turbines to the grid or to a variety of points of electrical power consumption such as a submerged docking station for unmanned underwater vehicles (UUV's), a desalination plant, or even a heat recovery storage and steam generation plant, as described in recent U.S. patent Ser. No. 10/012,113, of the same inventor.

FIG. 14*a* shows the embodiment of FIG. 9*a* floating on the surface of the ocean, being entirely enclosed in a vessel surrounded securely by the horizontally positioned torroidal float 490, which keeps shaft 20, substantially vertical in still water, as it was described above. This embodiment is further equipped with a marine propulsion engine 460 and a steering rudder 461. Using the propulsion engine, the turbines transportation from and to the electricity production ocean sites does not require a tag boat. During this transport the rotating mass is immobilized at a home position by chain means.

In addition, this embodiment is equipped with an air compressor 462, which is in fluid communication with the upper surface of float 121.

Figure 14B:
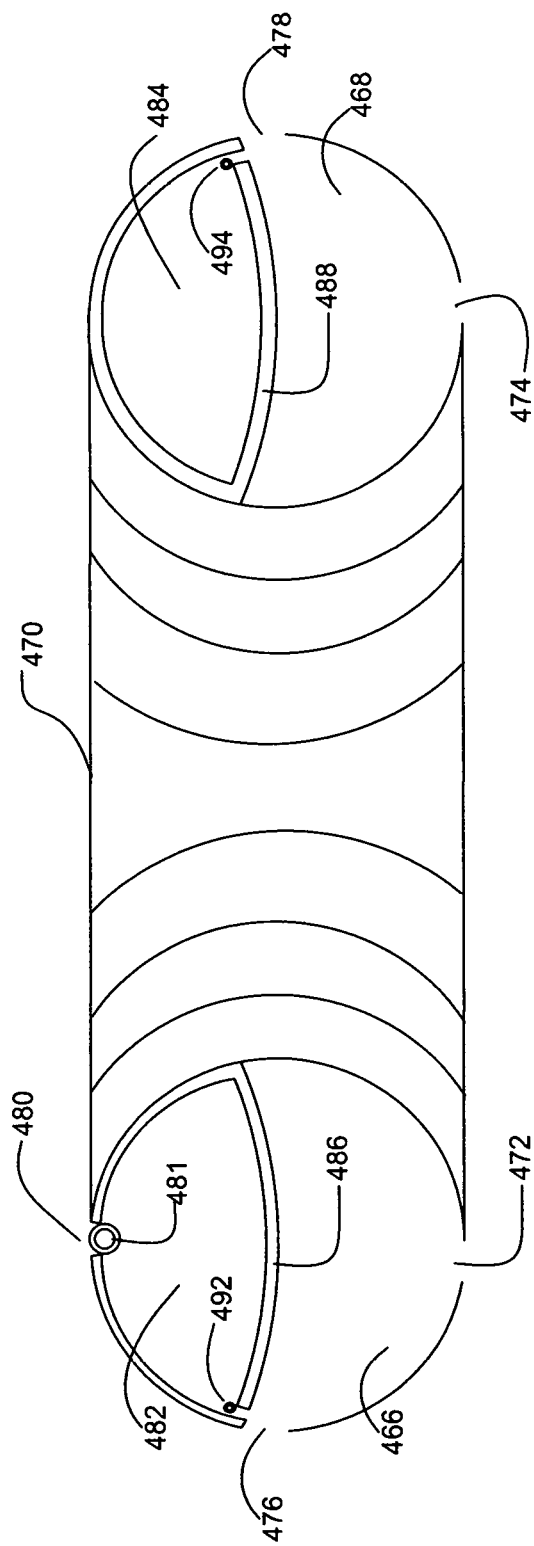
FIG. 14b shows a float with a ballast tank and a compressed air tank.

FIG. 14*b* shows a vertical cross section of float 490. Internally, the float is divided into two sections by an internal horizontal and continuous divider wall indicated by 486 and 488. The lower section is the ballast tank indicated by chambers 466 and 468 and the upper section is the compressed air tank indicated by 482 and 484.

In extreme weather, flood ports 472 and 474 open, allowing ocean water to enter the ballast tank. During this process the air vents 476 and 478 remain open. As a result the vessel sinks under the surface of the water for protection. When the harsh conditions are over, the flood ports open and high pressure air is introduced into the ballast tank through the air valves 492 and 494. The air vents 476 and 478 will be closed. The air pushes the water out of the ballast tank through the flood ports. Once the weight of the water is removed, the vessel rises up again to the surface of the ocean. Compressed air is replenished into the compressed air tank through compressed air inlet 480 and inlet valve 481. Air compressor 462, shown in FIG. 14*a* is in fluid communication with inlet 480. While submerged, the rotating mass still continues to produce electricity by the rotating mass 10.

The invention claimed is:

1. A turbine comprising:
a shaft being vertical in a non-operative position;
a mass eccentrically and bearing mounted for rotation about said shaft and on a perpendicular plane to said shaft;
said mass having a center of gravity at a distance of said shaft and an angular velocity;
a motion base comprising:
 a fixed base,
 a movable shaft support for supporting and moving said shaft,
 a prime mover means, powered by an external power source, connecting said fixed base with said movable shaft support for providing motion to said movable shaft support in relation to said fixed base in at least two degrees of motion freedom including pitch and roll motions allowing said shaft to incline in a plurality of planes, setting said mass in said rotation and maintaining said angular velocity,
wherein said prime mover means is at least one actuator connecting said fixed base to said movable shaft support for supporting and providing motion to said movable shaft support, in relation to said fixed base.

2. The turbine of claim 1 wherein: said movable shaft support is a universal pivoting shaft support, pivoting about said fixed base.

3. The turbine of claim 1 further including:
a floating vessel being in communication with ocean waves, having a floor securely supporting said fixed base, a roof enclosing entirely for protection said motion base, said shaft and said mass mounted for rotation, and a floating tube horizontally surrounding and being firmly attached to said floating vessel, for keeping said floating vessel substantially horizontal when floating in still water.

4. The turbine of claim 3, further including:
means of monitoring said ocean waves parameters.

5. The turbine of claim 1, further including:
an electrical generator having a rotor in rotational communication with said mass and a stator supported on said shaft.

6. The turbine of claim 1 further including:
a control means for setting said mass in a desired angular velocity, by constantly comparing said mass angular velocity to said desired angular velocity and activating said motion base for providing said motion to said movable shaft support so that said angular velocity is equated to said desired angular velocity.

7. The turbine of claim 3 further including: an air compressor for providing a compressed air, a horizontal divider wall within said floating tube defining an upper compressed air section with an upper external wall and a lower ballast tank section with a lower wall and an ocean side wall,
at least one air vent on said ocean side wall and in proximity to said horizontal divider wall with an open air vent position and a closed air vent position,
at least one flood port on said lower wall with an open flood port position and a closed flood port position, for flooding said lower ballast tank with an ocean water when said at least one air vent and flood port are in said open positions,
a compressed air inlet valve on said upper external wall being in fluid communication with said air compressor, for filling said upper compressed air tank with said compressed air, at least one outlet compressed air valve on said divider wall for introducing said compressed air to said lower ballast tank for removing said ocean water from said lower ballast through said at least one flood port, when said at least one flood port is in said flood port open position while said at least one air vent is in said closed air vent position, and maintaining said ocean water out of said lower ballast tank by switching said open flood port position to said closed flood port position when said ocean water is totally removed form said lower ballast tank.

8. The turbine of claim 3, further including:
a marine propulsion engine and a steering rudder.

9. A turbine comprising: a pivoting platform pivoting about a horizontal axis, pivotally supported by a pivot;
a shaft having a main axis perpendicular to said pivoting platform, being rigidly supported by said pivoting platform in a position where said main axis crosses said horizontal axis;

a mass eccentrically and bearing mounted for rotation about said shaft on a rotational plane perpendicular to said shaft; said mass having a center of gravity at a distance from said shaft and an angular velocity; and a motion base comprising:
an underwater floating frame moored to the ocean floor, a submerged buoy supporting entirely enclosed, said pivot, said pivoting platform, said shaft and said mass, mounted on said underwater floating frame for pivoting about a substantially horizontal axis,
an at least partially submerged buoyant panel firmly fixed on and disposed directly above said submerged buoy, to receive ocean wave surge forces from an incident wave having an incident wave period,
said horizontal axis is arranged to be substantially parallel to ocean wave surge,
whereby ocean wave surge moves said buoyant panel and pivots said submerged buoy and said shaft, causing said mass to rotate.

10. The turbine of claim 9 wherein: said submerged buoy is a solid of revolution with a main axis and is mounted on said underwater floating frame for pivoting about said main axis.

11. The turbine of claim 10 wherein: said solid of revolution is a cylinder.

12. The turbine of claim 10, wherein:
said solid of revolution is a sphere.

13. The turbine of claim 9 further including:
an electrical generator having a rotor in rotational communication to said mass with said angular velocity, a stator supported by said pivoting platform, and a torque force when said ocean wave surge forces from said incident wave with said incident wave period are exerted on said at least partially submerged buoyant panel.

14. The turbine of claim 13 further including:
a means for monitoring said incident wave period and a control means with sensors for monitoring and controlling said angular velocity by constantly comparing said angular velocity to a desired angular velocity value calculated from said incident wave period of said incident wave, and modifying said torque force so that said angular velocity is equated to said desired angular velocity value; said means for monitoring said incident wave period being in signal communication with said control means with sensors.

15. The turbine of claim 9, further including:
a motor/generator secured on said underwater floating frame being in rotational communication with said submerged buoy pivoting about said substantially horizontal axis.

16. An underwater electrical power plant comprising:
an underwater floating frame moored to the ocean floor for providing a substantially horizontal mount for pivoting to each one of a plurality of turbines each comprising:
a pivoting platform pivoting about a horizontal axis, pivotally supported by a pivot; a shaft having a main axis perpendicular to said pivoting platform, being rigidly supported by said pivoting platform in a position where said main axis crosses said horizontal axis;
a mass eccentrically and bearing mounted for rotation about said shaft on a rotational plane perpendicular to said shaft;
said mass having a center of gravity at a distance from said shaft and an angular velocity;
a submerged buoy supporting entirely enclosed, said pivot, said pivoting platform, said shaft and said mass, mounted for pivoting on said substantially horizontal mount, an at least partially submerged buoyant panel firmly fixed on and disposed directly above said submerged buoy to receive ocean wave surge forces from an incident wave;
an electrical generator having a rotor in rotational communication with said mass,
a stator supported by said pivoting platform;
said horizontal axis is arranged to be substantially parallel to ocean wave surge.

* * * * *